United States Patent Office 3,298,132
Patented Jan. 17, 1967

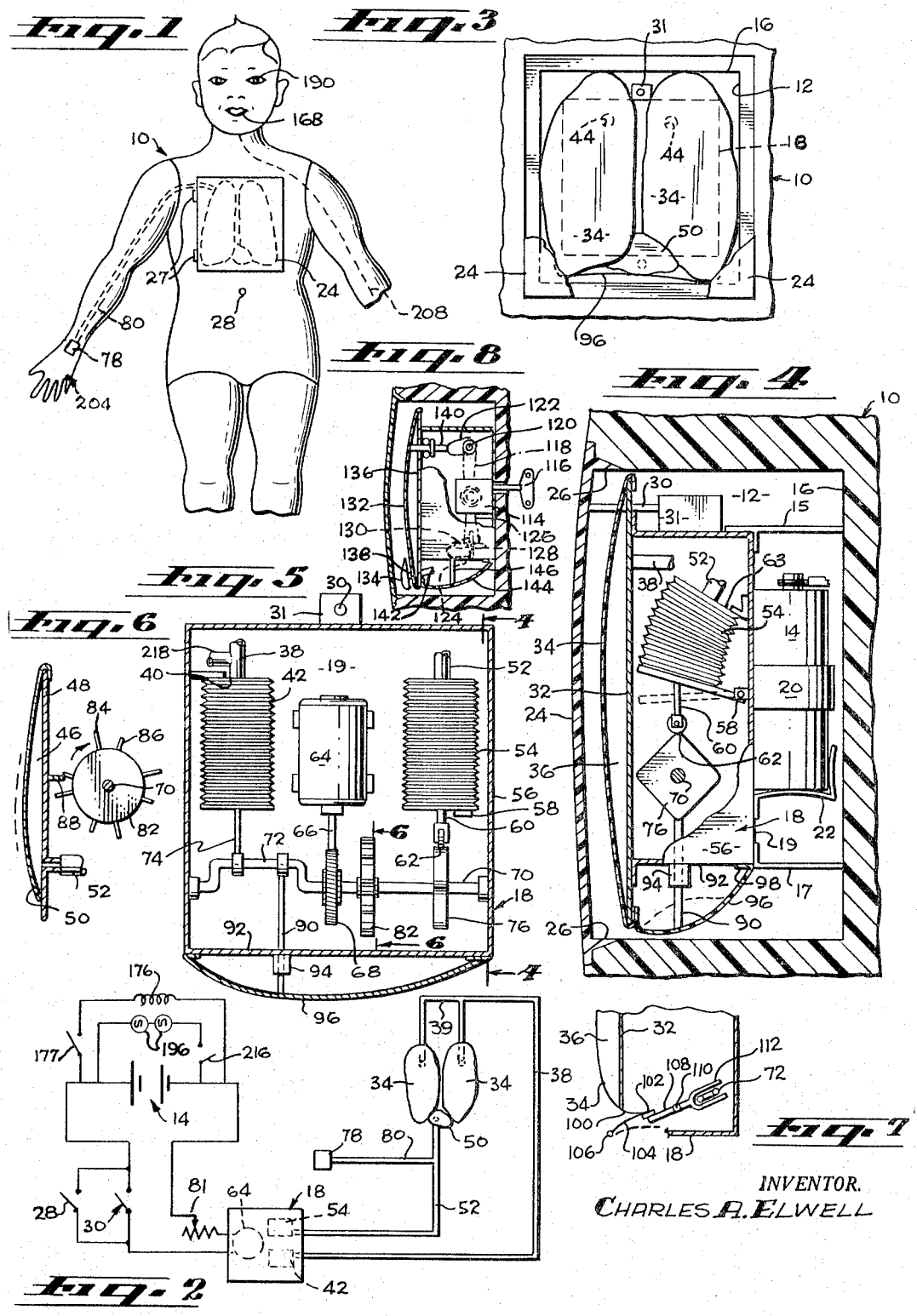
Jan. 17, 1967     C. A. ELWELL     3,298,132
HEARTBEAT SIMULATING MECHANISM FOR DOLLS
Original Filed Dec. 28, 1960
INVENTOR.
CHARLES A. ELWELL

3,298,132
HEARTBEAT SIMULATING MECHANISM
FOR DOLLS
Charles A. Elwell, Los Angeles, Calif., assignor to The Toy Development Center, Inc., a corporation of Nevada
Original application Dec. 28, 1960, Ser. No. 79,004, now Patent No. 3,154,881, dated Nov. 3, 1964. Divided and this application Oct. 8, 1964, Ser. No. 440,652
1 Claim. (Cl. 46—192)

This is a division of application Serial No. 79,004, filed December 28, 1960 (Patent No. 3,154,881).

This invention relates to mechanism simulating the natural and interrelated timing or physiological rhythm of certain living organs, and to anatomical models or simulacrums containing such mechanism. Thus the correlated rhythm of mammalian respiration and circulation is imitated audibly and/or visibly. Such manifestation may be produced, for example, in a doll, manikin or other model for either amusement or demonstration purposes. The combination of entertainment and education may be achieved in a child's toy. Accordingly one embodiment provides a doll having a self-contained power source and correlated mechanism for producing audible respiratory sounds and heart beats, plus visible pulsations of heart and arteries and expansion-contraction of lungs and diaphragm corresponding to the natural timing of these several parts in a living body.

Thus an important object is to provide a device for use in a "living" doll, whereby a child can listen to the heart beats by holding her ear to the body or alternately by using a stethoscope.

In particular embodiments, pulsations of the operatively connected heart-arteries and the lungs are produced respectively by means of separate, flexible, fluid-filled containers, typically bellows-operated air chambers. Alternately, pulsations of a more-or-less surrounding fluid chamber may be contact-transmitted to a sealed chamber representing heart or lungs which thus "beat" at the desired rates. In still another embodiment, a piston-operated flexible surface is employed without a fluid chamber to simulate pulsations of the respective circulatory or respiratory systems. A self-contained power source such as a dry cell or capsule of radioactive material, may be used or a clock-type mechanism may be provided for spring wind or other manual operation; or if desired, an electric motor can be incorporated to be plugged in to any convenient source of electrical current in the home or exhibit room.

The present mechanical features are advantageously associated with a model which shows internal skeletal structure, such as the ribs and sternum—that is, the cage elements of the pleural cavity, the areas of ossification either being painted or otherwise marked upon the external surface of the model, or else being embedded in or embossed upon an inner surface and externally visible through a transparent structure such as the removable chest plate. Also, for use as an education model the present doll may be packaged together with such instruments as an anesthetic mask, a stethoscope with which to listen to the heart beat and respiratory sound (including coughing) and/or a watch (or hour glass) for timing the pulse. Conventional mechanisms and structures can also be included in a doll or manikin, such as those for walking or other movement, for talking (by means of recordings), for intake and elimination of liquids etc., as well as removable abdominal organs and other parts.

Other advantages and purposes of the invention will be apparent as the description proceeds, particular reference being had to the illustrated, presently preferred embodiments which demonstrate the operation thereof as shown in the accompanying drawings wherein FIGURE 1 is a front elevational view of a doll, with a unit containing my pulsation mechanism shown mounted in the chest area and connected to a wrist chamber for there observing the pulse;

FIGURE 2 is a diagrammatic representation of the fluid lines and electrical connections of the activating mechanism;

FIGURE 3 is a top plan view of a container housing the activating mechanism in a chest cavity, most of the cover of the cavity being broken away;

FIGURE 4 is a longitudinal sectional view along line 4—4 of FIGURE 5 taken through the mounted housing with some of the internal elements seen in elevation;

FIGURE 5 is a top plan view of the mechanism within the housing, with the inflation membranes removed;

FIGURE 6 is a sectional view taken along the line 6—6 of FIGURE 5 particularly showing the heart chamber and, in elevation, the rotary mechanism which produces the heart sounds;

FIGURE 7 is a side elevational view of an alternate form of linkage for oscillating the diaphragm;

FIGURE 8 is a longitudinal sectional view thru the mounted housing similar to FIGURE 4 but showing a modified form of mechanism for operating the heart, lungs and diaphragm, in response to a spring motor, these several organs being represented alone by flexible surfaces without inflation chambers.

It is contemplated that in most instances, my mechanism will be installed in a doll or manikin which represents a human (or animal), but it can also be employed by itself or with a minimum of surrounding housing as a demonstration model of simulacrum particularly to show the related rhythms or action of the heart, lungs, diaphragm, etc.

For purposes of description, the mechanism in whole or part will hereafter be referred to in relation to its use in a representation of a human figure such as a doll. Advantageously, its incorporation as a unit in existing doll or manikin bodies can be effected with a minimum of structural alteration of the latter, but such specific embodiment should not be regarded as a necessary limitation to its use. Likewise, various features here operated by unitary mechanism can if desired be employed separately.

Conveniently a more-or-less rectangular cavity 12 is provided in the chest area of the doll 10, of a capacity (depending upon the size of the doll) to receive both the present mechanism plus one or more power units such as dry cells 14 used to operate the same. Alternately, if the chest cavity is not large enough, the connected power source can be lodged in one or more other cavities of the body such as in a hollow arm or leg, or elsewhere in the torso.

Both for convenience of assembly and to promote the interchangeability or replacement of such operating unit, the several elements thereof are compactly group together for removable insertion as a unit into a box-like, fixed housing 16 which is formed in place in the doll or else has its preconnected walls inserted into the body cavity 12 and anchored thereto. Spaced within the larger housing 16 and supported by resilient bracket arms 15, 17 (FIG. 4) is an inner frame or container structure 18, to the back of the rear surface (19) of which, one or more dry cells 14 may be detachably secured as by spring clips 20, 22. The cavity or housing 16 is itself provided with a snap-on or press-fit type closure or cover plate 24 of more-or-less rectangular outline and curved in general conformity with the natural configuration of the chest of a child or adult as the case may be. The chest plate 24 is desirably transparent, and conveniently possesses a certain resiliency so that a slight additional bending thereof is required to press it into place: the consequent tension tending to return it to shape will retain it in place by reason of lateral engagement of an opposing pair of inward extending lips 26. Rather than being completely detachable, said chest plate may be hinged as at 27.

An outwardly projecting stud 30 is the trigger of a spring-loaded switch element 31 carried by the frame 18 in position terminally to be contacted by the under face of the cover plate when closed. Thus as the cover plate 24 is pressed upon the doll, the trigger 30 is held depressed in the "OFF" position; conversely the mechanism is automatically turned on or started operating as soon as the chest plate is lifted and the trigger released. Another spring-loaded switch 28 may also be provided, conveniently in the naval depression, so that the mechanism can be operated and observed without removing the cover plate; thus especially when using a stethoscope, the heart can be heard with the chest plate closed.

The front of the inserted housing 18 itself is closed by a more-or-less rigid backing surface 32 which extends outward along each edge of the housing beyond the periphery and has a flexible membrane 34 disposed over its outer face and secured thereto about its outer edge or margin, the membrane having a surface area appreciably greater than that of the backing 32, so as to define an inflatable chamber 36 therebetween. Access to the chamber is by an air line 38 joining the fixed or outlet end 40 of a bellows 42 with an aperture 44 in the backing member 32 of the chamber 36. The forward or exposed face of the membrane 34 is shaped and/or colored to represent a lung surface, both right and left halves of a mammalian lung being presented (FIG. 3) either upon a front membrane of the same inflatable chamber 36 or upon membranes of separate chambers coupled by a dual line 39 to the same bellows 42 for simultaneous inflation and deflation as represented diagrammatically in FIG. 2.

A similar fabricated chamber 46 is shaped, lined and colored to represent a heart (FIGS. 3 and 6) being disposed in the correct anatomical position along the lower margins and between the two halves of the lung. As with the lungs, a heart chamber is formed of a rigid or semi-rigid backing member 48 having its forward face loosely covered by a flexible membrane 50 secured about the periphery thereof, with the thus-formed chamber 46 supplied by an air line 52 from a second bellows 54. The heart bellows 54 has its oscillating end hingedly secured (58) adjacent a side wall 56 of the housing frame 18 with an axially projecting rod 60 extending therefrom and terminally supporting a free roller or cam follower 62. The opposite end 63 of the heart bellows is fixed at an angular position.

Secured to the floor or inner surface of the back wall 19 of the housing frame 18 is an electric motor 64 operatively connected to the dry cells 14 thru the switches 28 and 30; and by means of a drive shaft 66 and worm gear and pinion 68 the motor operates a transverse cam shaft 70 at a rotation of the desired speed such as 20 revolutions a minute. The lung bellows 42 has its movable end joined to a crank arm 72 of the shaft 70 by a piston arm 74 so that the lung cavity 36 is thus inflated and deflated four times a minute. It will be observed that the total or confined volume of air within the bellows 42 and lung cavity 36 remains the same, since it is a closed system, but back compression of the bellows forces the compressed fluid to inflate the lung cavity 36, thus causing the front surface 34 to expand outward. Likewise, when the bellows rod 74 is extended, the lung membrane 34 is sucked inward or collapses. Continuous alterations of these two phases by the timing or pumping mechanism result in very visually discernible "pulsation" of the flexed lung surface (or of the heart surface 50 as the case may be).

Desirably the exposed heart or lung surface (34, 50) is resilient so as to absorb folds or wrinkles therein when contracting, altho if it were merely flexible and the folds became evident upon each contraction, it would not affect its operability.

Also affixed to the operating shaft 70 is a four-sided cam 76 (FIGS. 4–5) against which the cam follower 62 is continuously pressed by the resilence or expansion force of the heart bellows 54. (If desired, the cam 76 and roller 62 can also be held together magnetically or by spring action). Accordingly, for each complete rotation of the shaft 70 or attached cam 76, the heart chamber 46 will pulsate four times (in unison with the bellows 54). In other words, the heart "beats" four times (or 80 times a minute) for each inflation of the lungs, which is the approximate physiological ratio. Such heart pulsation is manifestly visible (upon opening the chest plate 24 if the latter is rigid). In order to make it visible with the plate closed, as well as tactilly measurable in a natural manner, there is provided a wrist chamber 78 also connected by an air line 80 to the heart bellows 54 so that its external elastic membrane pulses the same as does the heart; a child by feeling this pulsating membrane can count or measure the pulse of the doll similar to that of a live patient. If desired, a rheostat 81 can be included in the electric circuit so that the operator can vary the pulsation rate.

Synchronous mechanism is also provided for producing an audible manifestation of the heart action. For each natural contraction of the living heart there are two discernable valve sounds (i.e. of auricle and ventricle) of different intensity or pitch, both of which are hereby reproduced. Fixedly mounted on the operating shaft 70 is a radially extending disk or annulus 82 carrying four, radially projecting pairs of fingers (FIG. 6), the two members 84, 86 of each pair being of unequal length and each disposed in turn, upon rotation to contact the end of a relatively rigid stud 88 upstanding from the rear face of the heart backing surface 48. Each such contact of stud 88 and finger 84, 86 results in a visible shock wave extending over the entire "heart" and also produces an audible sound, the second or ventricle sound (longer finger) being of lower pitch than that of the auricle.

The spacing around the sound wheel 82 is two units between the members (84, 86) of a pair, and three units between each pair, thus corresponding to the actual physiological timing. Of course, if more convenient, the sound-producing reed 88 can be mounted on the housing frame 18 or elsewhere, and its direct vibration of the heart structure dispensed with.

Correlated exhalation and inhalation movement of a structure simulating a living diaphragm, in synchronization with the moving lungs is provided by means of a piston rod 90 also carried by the crank arm 72 laterally to the lung bellows arm 74 and longitudinally reciprocable in unison therewith the further extremity being journalled in an upstanding wall 92 and adjacent outer collar 94 of the frame 18. The terminous of the rod is fastened to a generally vertically disposed (when the doll is reclining) sheet 96 of fabric or the like which extends down loosely from the lower edge or margin of the lung backing surface 32, with its opposite margin 98 attached to the outer face of the frame wall 92. Accordingly as the lungs "fill" with air by contraction of the bellows 42, downward movement of the diaphragm rod 90 (as viewed in FIGS. 4–5) moves the fabric 96 outward, that is toward the feet of the doll, so as to extend it to the full and take out the folds. Upon "exhalation" of the lungs or expansion of the connected bellows 42, the diaphragm rod 90 simultaneously retracts and the fabric layer 96 again collapses into folds. This action is of course apparent with the cover plate 24 open or removed but may also be viewed thru it when the latter is transparent, being particularly evident when the "diaphragm" is brightly colored.

A modified form of diaphragm and pulsating arm is shown in FIGURE 7. A transverse strip of flexible material 100 extends loosely from the lower margin of the lung surface 34 back to a movable cross rod 102, while spaced below (i.e. toward the feet of the doll) a similar cross strip of flexible sheet material 104 is held between the oscillatable cross rod 102 and a fixed cross member 106, the latter being disposed approximately parallel to and in the same plane as the bottom margin of the lung. The cross rod 102 is arcuately movable, being carried by one end of a lever or pulsating arm 108 which is pivoted at 110 within the housing 18 and has a bifurcate end 112 within which the crank arm 72 is received. Accordingly, with each revolution of the cam shaft 70, the cross rod 102 raises and lowers the "diaphragm" 104 synchronously with the contraction and expansion of the lungs. In other words, as the forward face 34 of the lungs is inflated outward, both the flap 100 and the connected diaphragm 104" "expand" downward; as the lungs collapse, the flap 100 and diaphragm 104 move upward in unison therewith.

In another modified embodiment of the invention illustrated in FIGURE 8, in place of an electric motor there is provided a spring driven motor or mechanism 114, conveniently manually wound by an externally projecting key 116, which motor by a chain drive 118 rotates a transverse drive shaft 120 carrying a cam 122. A lower, parallel drive shaft 124, also rotated by a chain drive 126, carries a four-pointed cam 128 (analogous to the square cam 76) and one single-finger cam 130. In place of air filled chambers for the lungs and heart, each is replaced by a flexible or resilient surface 132 and 134 respectively, bowed outwardly from a rigid backing support 136, 138, each of which in turn is traversed by a spring-retractable plunger 140, 142, aligned for contact with the respective cam finger 122 or 128. Thus, as before, the heart pulsates four times for each expansion of the lungs, and the diaphagm 144 is synchronously moved by a piston rod 146 in response to the cam 130 carried by the lower drive shaft 124 as in the earlier model.

While the several bellows and connected fluid lines have been designated as air filled from time to time, because this is generally the most readily available fluid and like most other gases is both non-toxic and compressible, it is to be understood that other gases may be substituted in whole or part, and also such fluid may consist of liquids such as water if desired. It will be apparent to those skilled in the art that a considerable choice of material for the inflatable fluid chambers is currently available, of which particular mention may be made of plastic fabric now used in aqua lungs and skin diving suits.

I claim:

A mechanical heartbeat mechanism for a sounding toy comprising:
   operative means adapted to produce a pattern of intermittent sound characterized by closely-spaced, dual beats separated by a different time interval than the interval between said dual beats, said operative means comprising rotary drive means, a vibratory element adapted to simulate a heart sound, and intermittent contact mechanism mutually connecting said vibratory element and drive means, said contact mechanism being characterized by a spaced recurrent sequence of contact points corresponding to said pattern of intermittent sound.

References Cited by the Examiner
UNITED STATES PATENTS

| 2,504,679 | 4/1950 | Goldfarb | 46—189 |
| 2,887,818 | 5/1959 | Zalkind | 46—175 X |
| 3,014,312 | 12/1961 | Convertine | 46—247 |

DELBERT B. LOWE, *Primary Examiner.*

RICHARD C. PINKHAM, *Examiner.*

R. F. CUTTING, *Assistant Examiner.*